J. SAND & J. SAND, Jr.
LEVEL.
APPLICATION FILED OCT. 13, 1913.
1,087,555.
Patented Feb. 17, 1914.
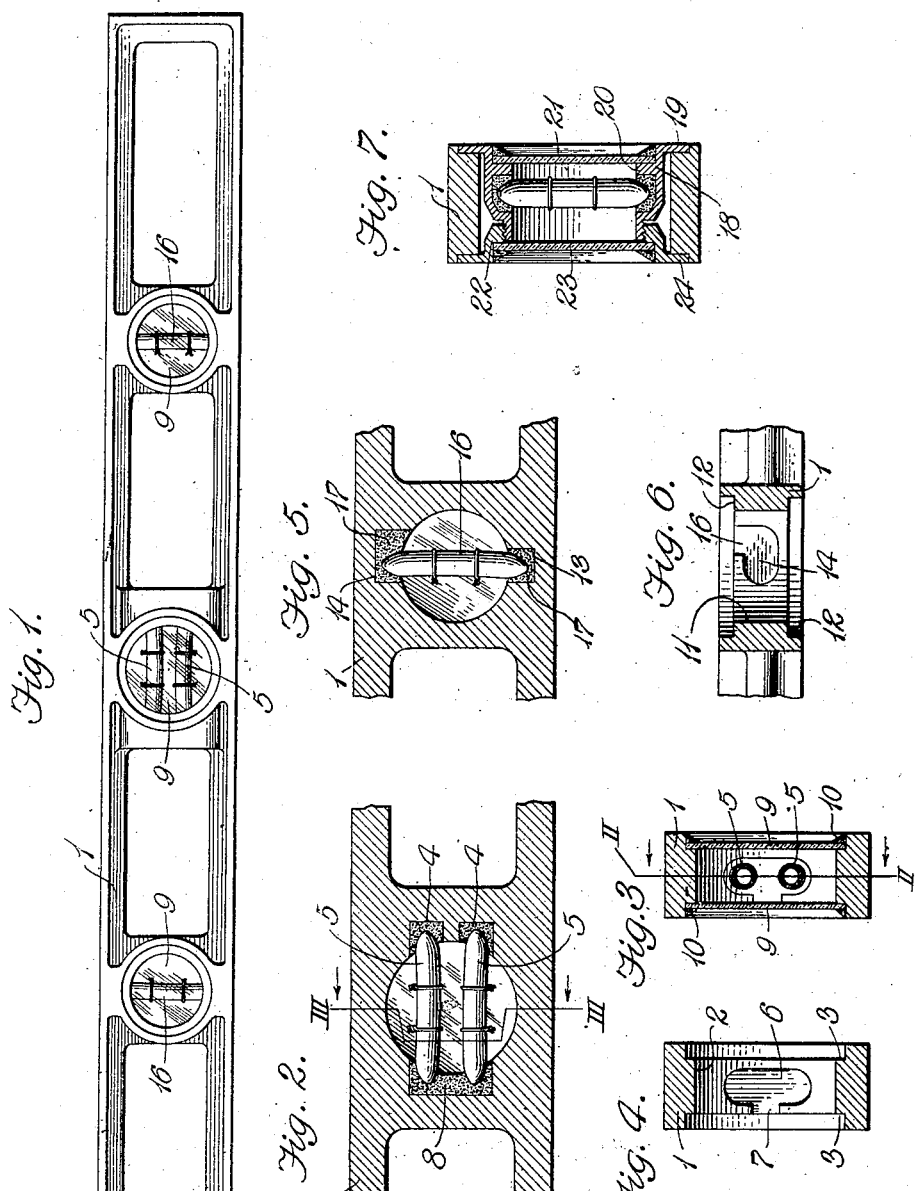

UNITED STATES PATENT OFFICE.

JULIUS SAND AND JULIUS SAND, JR., OF DETROIT, MICHIGAN.

LEVEL.

1,087,555.   Specification of Letters Patent.   Patented Feb. 17, 1914.

Application filed October 13, 1913. Serial No. 794,780.

*To all whom it may concern:*

Be it known that we, JULIUS SAND and JULIUS SAND, Jr., citizens of the United States of America, residing at Detroit, in the county of Wayne and State of Michigan, have invented certain new and useful Improvements in Levels, of which the following is a specification, reference being had therein to the accompanying drawings.

In the construction of spirit levels it is desirable that the tubes when in position be so retained that they cannot be readily dislodged and that means be also afforded for adjusting the tubes after they have once been set if accident requires it.

This invention relates to levels and to an arrangement thereof whereby the tubes when once set are not readily displaced and whereby the level may be readjusted in case of accident.

The invention consists in the matters hereinafter set forth and more particularly pointed out in the appended claims.

In the drawings, Figure 1 is a plan view of one form of level that embodies features of the invention; Fig. 2 is an enlarged view in transverse section through the middle portion of the level showing the tubes in position; Fig. 3 is a view in detail taken on or about line III—III of Fig. 2, with the section line II—II indicating the plane of view of Fig. 2; Fig. 4 is a view in detail taken on or about line III—III of Fig. 2 with the tubes removed; Figs. 5 and 6 are views in detail showing the method of securing the single tube; and Fig. 7 is a view in detail showing an adjustable holder for the tubes.

Referring to the drawings, a body or frame 1 is formed preferably of aluminum alloy or other light metal with a central tube opening and symmetrically disposed plummet tube openings. Each of the openings is encircled by an inner annular flange 2 with corresponding shoulders 3 formed by rabbets on each side. End socket openings 4 to receive the level tubes 5 of the central opening are formed in the flange of the central opening. At a diametrical point, a single recess 6 is formed with a central slot 7 whereby the ends of the tubes 4 may be readily entered and moved to position. Cement filling 8 retains the tubes in position, the metal that overlies them on both sides preventing dislodgment of the holding material. Glass disks 9 are seated on the shoulders 3 and held in place by cement or wax 10.

At the plummet openings which are preferably circular, the inner annular flange 11 with rabbeted shoulders 12 on either side has a recess 13 on one side and a diametrically opposite recess 14 with inner slot 15 on the other side whereby a plummet tube 16 may be readily entered and secured by cement or wax filling indicated at 17. Glass disks cover the plummet tubes as they do the level tubes.

In place of securing the tubes directly in the body of the level they may be mounted as indicated in Fig. 7. A bushing 18 has an annular flange 19 whereby it may be centered in the tube opening of the level body which is properly counterbored to receive it. The shell of the bushing is itself provided with an annular seat 20 for the reception of a glass disk 21 and is likewise recessed at diametrically opposite points in a manner similar to the openings previously described. A clamping collar 22 that is fitted with a guard glass disk 23 is in screwthreaded engagement with the bushing whereby an outer annular flange 24 of the collar may be drawn to seat in a counterbored bearing shoulder of the level body. This permits angular adjustment of the tubes after being mounted in the level body and their ready withdrawal for inspection or replacement.

In ordinary level construction particularly where metallic bodies are used, it is usual to insert the tubes in position through apertures in the sides of the body which are afterward plugged. This gives a chance for the entrance of dirt or liquid into the tube chamber. By the construction herein shown, the tubes are inclosed in a hermetically sealed chamber. By the use of the adjustable holder the tubes may be readily turned into proper relation to the bearing surfaces of the level after insertion. The holder itself forms an air tight and dust proof chamber. Because of the disposition of the tubes and holding cement or wax does not tend to work out as the margin of the recesses prevent its lateral displacement. The holder may be used with a wooden tube if desired.

Obviously, changes may be made in the details of construction without departing from the spirit of our invention and we do not care to limit ourselves to any particular form or arrangement of parts.

What we claim is:—

1. In a spirit level, the combination of a body having tube openings, with a holder for each opening, consisting of a bushing having an inner annular flange with oppositely disposed recesses therein, one of which has an off-set slot extending to the margin of the flange, a collar in screwthreaded engagement with the bushing, and coöperating therewith to secure it in the body, and tubes in the bushing whose end portions are embedded in sealing material filling the recesses.

2. The combination in a spirit level of a body having tube openings whose ends are counterbored, with tube holders each consisting of a sleeve having an outer annular flange seated in a counterbored end of a body opening, an inner annular flange provided with oppositely disposed recesses, one of which has an off-set slot extending into the margin of the flange, an exteriorly flanged clamping collar screwthreaded on to the inner end of the bushing and seated in the other counterbored end of the body opening, tubes whose end portions are embedded in sealing material filling the bushing recesses, a transparent disk sealed in the outer end of the bushing and a transparent guard disk sealed in the clamping collar.

In testimony whereof we affix our signatures in presence of two witnesses.

JULIUS SAND.
JULIUS SAND, Jr.

Witnesses:
C. R. STICKNEY,
A. M. DORR.